(12) United States Patent
Couvignou et al.

(10) Patent No.: US 12,193,631 B2
(45) Date of Patent: Jan. 14, 2025

(54) SYSTEMS AND METHODS FOR IMPROVED CONTROL OF NONHOLONOMIC ROBOTIC SYSTEMS

(71) Applicant: Brain Corporation, San Diego, CA (US)

(72) Inventors: Philippe Couvignou, San Diego, CA (US); Mengze Eduardo Troncoso Xu, San Diego, CA (US)

(73) Assignee: Brain Corporation, San Diego, CA (US)

(*) Notice: Subject to any disclaimer, the term of this patent is extended or adjusted under 35 U.S.C. 154(b) by 603 days.

(21) Appl. No.: 17/346,386

(22) Filed: Jun. 14, 2021

(65) Prior Publication Data

US 2021/0298552 A1    Sep. 30, 2021

Related U.S. Application Data

(63) Continuation of application No. PCT/US2019/065655, filed on Dec. 11, 2019.

(60) Provisional application No. 62/778,574, filed on Dec. 12, 2018.

(51) Int. Cl.
*A47L 9/28* (2006.01)
*G05D 1/00* (2024.01)

(52) U.S. Cl.
CPC .......... *A47L 9/2805* (2013.01); *A47L 9/2852* (2013.01); *G05D 1/0274* (2013.01); *A47L 2201/04* (2013.01)

(58) Field of Classification Search
CPC ........ A47L 9/28; A47L 9/2805; A47L 9/2852; A47L 2201/04; B62D 15/025; G05D 1/0212; G05D 1/0274; G05D 2201/0215
See application file for complete search history.

(56) References Cited

U.S. PATENT DOCUMENTS

| | | | |
|---|---|---|---|
| 8,825,263 B1* | 9/2014 | Nelson, Jr. | G01C 21/3617 701/25 |
| 2005/0080513 A1 | 4/2005 | Ito | |
| 2015/0153738 A1* | 6/2015 | Al-Buraiki | G05D 1/024 701/117 |
| 2015/0158182 A1 | 6/2015 | Farlow et al. | |
| 2015/0284010 A1* | 10/2015 | Beardsley | G08G 1/096816 701/1 |
| 2015/0346728 A1* | 12/2015 | Peake | A01B 69/004 701/23 |

(Continued)

OTHER PUBLICATIONS

International Search Report and Written Opinion for PCT/US19/65655 dated Mar. 2, 2020.

(Continued)

*Primary Examiner* — Jason Holloway
*Assistant Examiner* — Blake A Wood
(74) *Attorney, Agent, or Firm* — Pierson Ferdinand LLP; Sidharth Kapoor

(57) ABSTRACT

Systems and methods for improved control of nonholonomic robotic systems are disclosed herein. According to at least one non-limiting exemplary embodiment, a holonomic reference point on or nearby a nonholonomic robot may be determined and utilized to navigate the robot along a target trajectory. Due to the holonomicity of the reference point, control logic of the robotic system may be greatly simplified, thereby enhancing accuracy of navigation and navigation capabilities of nonholonomic robotic systems.

15 Claims, 8 Drawing Sheets

(56) References Cited

U.S. PATENT DOCUMENTS

| | | | |
|---|---|---|---|
| 2017/0038776 A1* | 2/2017 | Gariepy | G05D 1/0022 |
| 2017/0100007 A1* | 4/2017 | Matsumoto | A47L 9/0472 |
| 2017/0280960 A1 | 10/2017 | Ziegler et al. | |
| 2018/0206686 A1* | 7/2018 | Shigeto | A47L 9/0477 |
| 2019/0204852 A1* | 7/2019 | Fritz | G01S 19/45 |
| 2021/0154840 A1* | 5/2021 | Vogel | B25J 9/1666 |

OTHER PUBLICATIONS

Laumond et al. "Guidelines in Nonholonomic Motion Planning for Mobile Robots", Robot Motion Planning and Control [online], pp. 1-53, published 1998 [retrieved on Feb. 12, 2020]. Retrieved from the Internet <URL:http://citeseerx.ist.psu.edu/viewdoc/summary?doi=10.1.1.131.8696> entire document, especially p. 1-4.

* cited by examiner

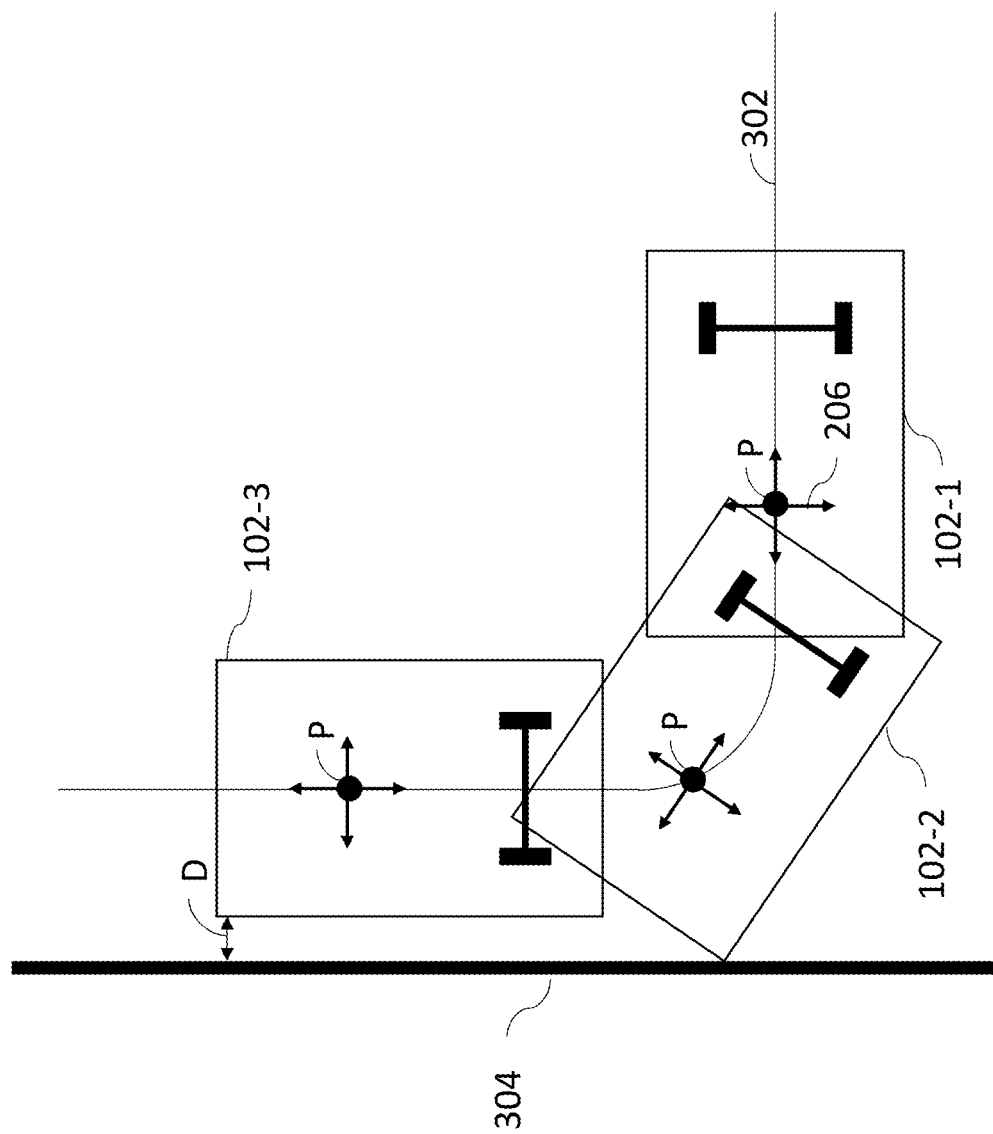

SYSTEMS AND METHODS FOR IMPROVED CONTROL OF NONHOLONOMIC ROBOTIC SYSTEMS

PRIORITY

This application is a continuation of International Patent Application No. PCT/US19/65655 filed Dec. 11, 2019 and claims the benefit of U.S. Provisional Patent Application Ser. No. 62/778,574 filed on Dec. 12, 2018 under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application generally relates to robotics, and more specifically to systems and methods for improved control of nonholonomic robotic systems.

Background

Currently, many robots may utilize a differential drive configuration for locomotion, wherein two wheels or treads are utilized to navigate the robots. The differential drive configuration, and other similar configurations, however, may cause movement of the robots to become nonholonomic (i.e., the robots are constrained to movement along restricted degrees of freedom). The nonholonomicity of these robots may impose additional constraints for a controller to generate control signals to actuators to configure the robots to move along a target trajectory. Nonholonomic properties of these robots may additionally impose additional constraints to route planning as the nonholonomicity of the robots may inhibit movement of the robots at points along a route.

Additionally, to overcome nonholonomic constraints, the nonholonomic robots may plan routes based on a nonholonomic reference point, usually between fixed position rear wheels or axels, which may limit the number of potentially navigable routes when utilizing the nonholonomic reference point. These nonholonomic robots, however, may comprise at least one reference point within or nearby the robot which is holonomic. Accordingly, there is a need in the art for improved systems and methods for control of nonholonomic robotic systems utilizing a holonomic reference point such that nonholonomic robots may navigate a target trajectory with improved accuracy and increased degrees of freedom.

SUMMARY

The foregoing needs are satisfied by the present disclosure, which provides for, inter alia, systems and methods for control of nonholonomic robotic systems.

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a method for improved control of a nonholonomic robot is disclosed. The method may comprise a controller coupled to the robot determining a holonomic reference point P on or nearby the robot and utilizing the reference point P to accurately navigate the robot along a target trajectory. The method may further comprise applying a linear transformation to current route data based on the distance between the holonomic reference point P and an initial reference point M, wherein the initial reference point M may be a nonholonomic or holonomic reference point from which the target trajectory is defined. The method may further comprise utilizing a plurality of different holonomic reference points, defined at separate positions within the reference frame of the robotic system, at different locations along the target trajectory to execute different movements of the target trajectory, each movement corresponding to use of one of the plurality of holonomic reference points.

According to at least one non-limiting exemplary embodiment, a nonholonomic robotic system is disclosed. The nonholonomic robotic system may comprise a specialized processing device configured to execute computer readable instructions on a non-transitory storage medium, the instructions, when executed by the specialized processing device, cause the specialized processing device to determine a holonomic reference point P on or nearby the robotic system and utilizing the holonomic reference point P to navigate the robot along a target trajectory. The computer readable instructions may further configure the specialized processing device to apply linear transformations to route data based on a distance between the holonomic reference point P and an initial reference point M, wherein the initial reference point M may be a nonholonomic or holonomic reference point from which the target trajectory is defined. The computer readable instructions may further configure the specialized processing device to utilize a plurality of different holonomic reference points, defined at separate locations within the reference frame of the robotic system, at different locations along the target trajectory to execute different movements of the target trajectory, each movement corresponding to use of one of the plurality of holonomic reference points.

According to at least one non-limiting exemplary embodiment, a non-transitory computer readable storage medium is disclosed. The non-transitory computer readable storage medium may comprise a plurality of computer readable instructions which, when executed by a specialized processing device, configure the specialized processing device to determine a holonomic reference point P within or nearby a nonholonomic robotic system and utilize the holonomic reference point P to navigate the robotic system along a target trajectory. The non-transitory computer readable storage medium may further comprise computer readable instructions to apply a linear transformation to route data based on a distance between the holonomic reference point P and an initial reference point M, the initial reference point M may be a holonomic or nonholonomic reference point from which the target trajectory is defined. The non-transitory computer readable storage medium may further comprise computer readable instructions to utilize a plurality of different holonomic reference points, defined at separate locations within the reference frame of the robotic system, at different locations along the target trajectory to execute different movements of the target trajectory, each movement corresponding to use of one of the plurality of holonomic reference points.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not limit the disclosed aspects, wherein like designations denote like elements.

FIG. 3A is a top view of a nonholonomic robot utilizing a holonomic reference point to navigate close to a wall, according to an exemplary embodiment.

Figure 1A:
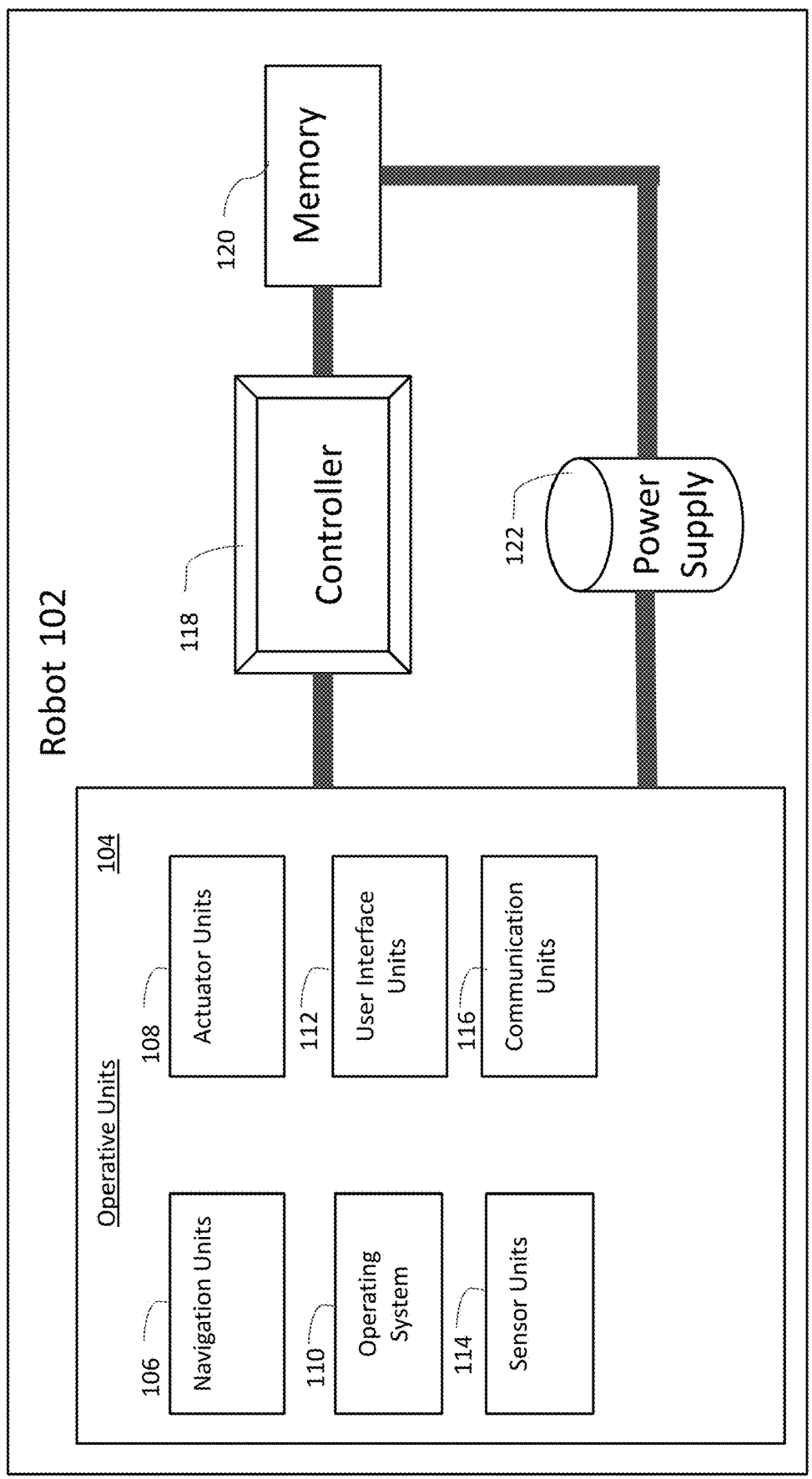
FIG. 1A is a functional block diagram of a main robot in accordance with some embodiments of this disclosure.

All Figures disclosed herein are © Copyright 2018 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for control of nonholonomic robotic systems. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, a nonholonomic robot may refer to a robot which may be limited with respect to its potential movements and/or degrees of freedom. For example, a robot capable of moving in all directions (e.g., laterally and horizontally) in a two-dimensional (2D) coordinate plane may be considered holonomic (e.g., robots with all-wheel steering). A robot not capable of moving in at least one direction in a 2D or 3D coordinate plane may be considered nonholonomic (e.g., differential drive robots, wherein the differential drive robot may not be capable of moving horizontally without turning).

As used herein, a reference point (e.g., points M and P discussed below) may comprise of a geometric point at a constant position with respect to a frame of reference of a robot utilized by the robot to navigate along a route. To navigate along a route, the robot may utilize actuators/motors to move the robot, and therefore move the reference point, such that the reference point follows the route. In other words, navigation along a route comprises of a robot moving such that the fixed reference point, with respect to the frame of reference of the robot, traces the route. For clarity, point M will denote a nonholonomic reference point and point P will represent a holonomic reference point.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processing device, microprocessing device, and/or digital processing device may include any type of digital processing device such as, without limitation, digital signal processing devices ("DSPs"), reduced instruction set computers ("RISC"), processing device complex instruction set computers ("CISC"), microprocessing devices, gate arrays (e.g., field programmable gate arrays ("FPGAs")), programmable logic device ("PLDs"), reconfigurable computer fabrics ("RCFs"), array processing devices, secure microprocessing devices, specialized processing devices (e.g., neuromorphic processing devices), and application-specific integrated circuits ("ASICs"). Such digital processing devices may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) improve control and accuracy of movement of nonholonomic robots; (ii) drastically and rapidly reduce a position error over time of nonholonomic robots; and (iii) enable a nonholonomic robot to navigate along any route, in the absence of external obstacles, despite the nonholonomic properties of the robot. Other advantages are readily discernable by one having ordinary skill in the art given the contents of the present disclosure.

According to at least one non-limiting exemplary embodiment, a method for improved control of a nonholonomic robot is disclosed. The method may comprise of a controller of the robot determining a holonomic reference point P on or nearby the robot and utilizing the reference point P to accurately navigate the robot along a target trajectory. The method may further comprise applying a linear transformation to current route data based on the distance between the holonomic reference point P and an initial reference point M, wherein the initial reference point M may be a nonholonomic or holonomic reference point from which the target trajectory is defined. The method may further comprise utilizing a plurality of different holonomic reference points, defined at separate positions within the reference frame of the robotic system, at different locations along the target trajectory to execute different movements of the target trajectory, each movement corresponding to use of one of the plurality of holonomic reference points.

According to at least one non-limiting exemplary embodiment, a nonholonomic robotic system is disclosed. The nonholonomic robotic system may comprise a specialized processing device configured to execute computer readable instructions on a non-transitory storage medium, the instructions, when executed by the specialized processing device, cause the specialized processing device to determine a holonomic reference point P on or nearby the robotic system and utilizing the holonomic reference point P to navigate the robot along a target trajectory. The computer readable instructions may further configure the specialized processing device to apply linear transformations to route data based on a distance between the holonomic reference point P and an initial reference point M, wherein the initial reference point M may be a nonholonomic or holonomic reference point from which the target trajectory is defined. The computer readable instructions may further configure the specialized processing device to utilize a plurality of different holonomic reference points, defined at separate locations within the reference frame of the robotic system, at different locations along the target trajectory to execute different movements of the target trajectory, each movement corresponding to use of one of the plurality of holonomic reference points.

According to at least one non-limiting exemplary embodiment, a non-transitory computer readable storage medium is disclosed. The non-transitory computer readable storage medium may comprise a plurality of computer readable instructions which, when executed by a specialized processing device, configure the specialized processing device to determine a holonomic reference point P within or nearby a nonholonomic robotic system and utilize the holonomic reference point P to navigate the robotic system along a target trajectory. The non-transitory computer readable storage medium may further comprise computer readable instructions to apply a linear transformation to route data based on a distance between the holonomic reference point P and an initial reference point M, the initial reference point M may be a holonomic or nonholonomic reference point from which the target trajectory is defined. The non-transitory computer readable storage medium may further comprise computer readable instructions to utilize a plurality of different holonomic reference points, defined at separate locations within the reference frame of the robotic system, at different locations along the target trajectory to execute different movements of the target trajectory, each movement corresponding to use of one of the plurality of holonomic reference points.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices (e.g., microprocessing devices) and other peripherals. As previously mentioned and used herein, processing device, microprocessing device, and/or digital processing device may include any type of digital processing device such as, without limitation, digital signal processing devices ("DSPs"), reduced instruction set computers ("RISC"), processing device, complex instruction set computers ("CISC"), microprocessing devices, gate arrays (e.g., field programmable gate arrays ("FPGAs")), programmable logic device ("PLDs"), reconfigurable computer fabrics ("RCFs"), array processing devices, secure microprocessing devices, specialized processing devices (e.g., neuromorphic processing devices), and application-specific integrated circuits ("ASICs"). Such digital processing devices may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processing device may be external to robot 102 and be communicatively coupled to controller 118 of robot 102 utilizing communication units 116 wherein the external processing device may receive data from robot 102, process the data, and transmit computer-readable instructions back to controller 118. In at least one non-limiting exemplary embodiment, the processing device may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processing devices. In some embodiments, a single controller (e.g., controller 118) may serve as the various controllers and/or processing devices described. In other embodiments different controllers and/or processing devices may be used, such as controllers and/or processing devices used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic. In exemplary embodiments, units of operative units 104 may comprise both computer-implemented instructions executed by a controller and hardcoded logic. Where operative units 104 are implemented in part in software, operative units 104 may include units/modules of code, algorithm, and/or series of executable steps that are configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators may actuate the wheels for robot 102 to navigate a route; navigate around obstacles; rotate cameras and sensors.

Actuator unit 108 may include any system used for actuating, in some cases to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art. According to exemplary embodiments, actuator unit 108 may include systems that allow movement of robot 102, such as motorize propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used here on out, a robot 102, a controller 118, or any other controller, processing device, or robot performing a task illustrated in the figures below comprises a controller executing computer readable instructions stored on a non-transitory computer readable storage apparatus, such as memory 120, as would be appreciated by one skilled in the art.

Figure 1B:
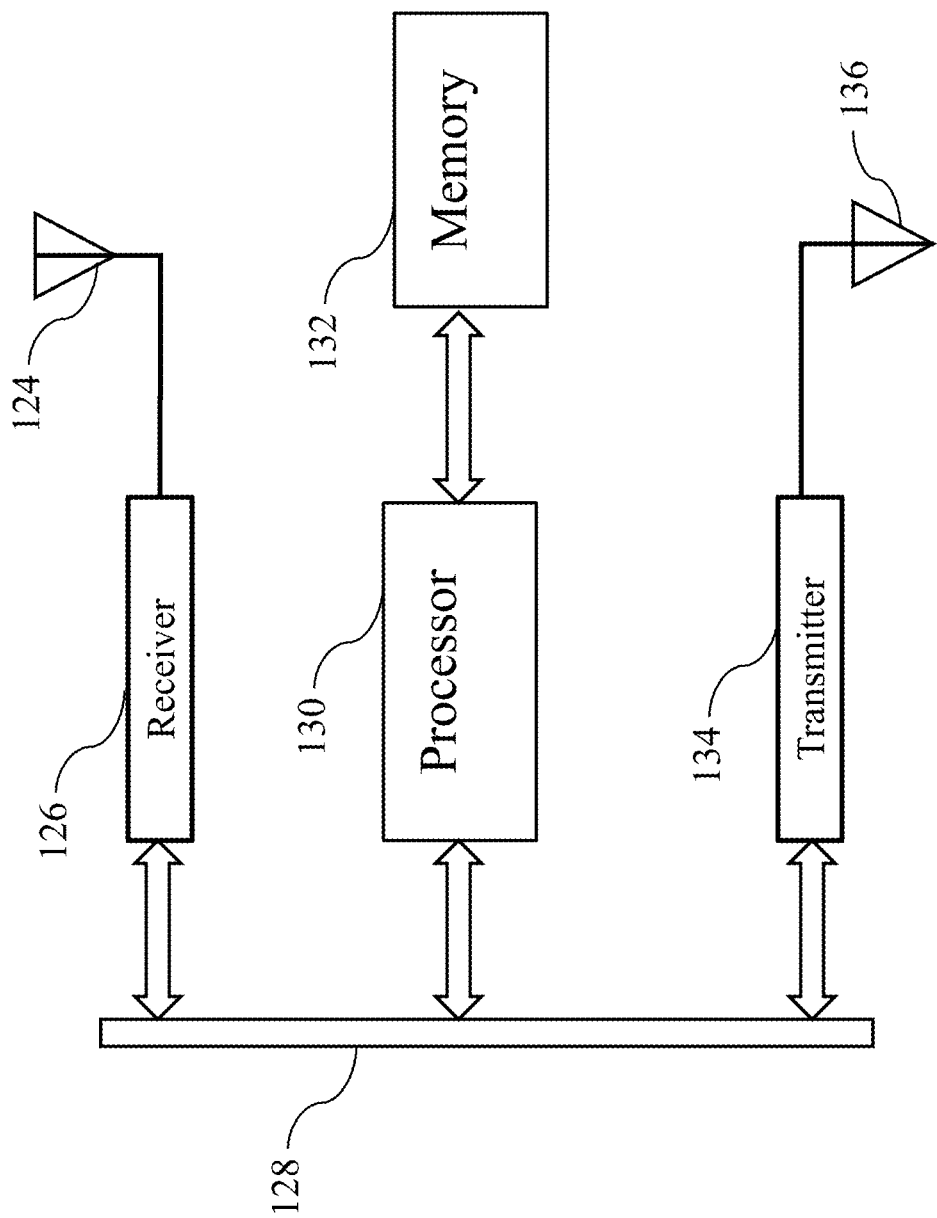
FIG. 1B is a functional block diagram of a controller or processing device in accordance with some embodiments of this disclosure.

Next referring to FIG. 1B, the architecture of the specialized controller 118 used in the system shown in FIG. 1A is illustrated according to an exemplary embodiment. As illustrated in FIG. 1B, the specialized computer includes a data bus 128, a receiver 126, a transmitter 134, at least one processing device 130, and a memory 132. The receiver 126, the processing device 130 and the transmitter 134 all communicate with each other via the data bus 128. The processing device 130 is a specialized processing device configurable to execute specialized algorithms. The processing device 130 is configurable to access the memory 132, which stores computer code or instructions in order for the processing device 130 to execute the specialized algorithms. As illustrated in FIG. 1B, memory 132 may comprise some, none, different, or all of the features of memory 124 previously illustrated in FIG. 1A. The algorithms executed by the processing device 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing by the specialized controller 118. The receiver 126 communicates these received signals to the processing device 130 via the data bus 128. As one skilled in the art would appreciate, the data bus 128 is the means of communication between the different components-receiver, processing device, and transmitter—in the specialized controller 118. The processing device 130 executes the algorithms, as discussed below, by accessing specialized computer-readable instructions from the memory 132. Further detailed description as to the processing device 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processing device 130 may communicate output signals to transmitter 134 via data bus 128 as illustrated. The transmitter 134 may be configured to further communicate the output signals to a plurality of operative units 104 illustrated by signal output 136.

One of ordinary skill in the art would appreciate that the architecture illustrated in FIG. 1B may illustrate an external server architecture that is configurable to effectuate the control of a robotic apparatus from a remote location. That is, the server may also include a data bus, a receiver, a transmitter, a processing device, and a memory that stores specialized computer readable instructions thereon.

Figure 2B:
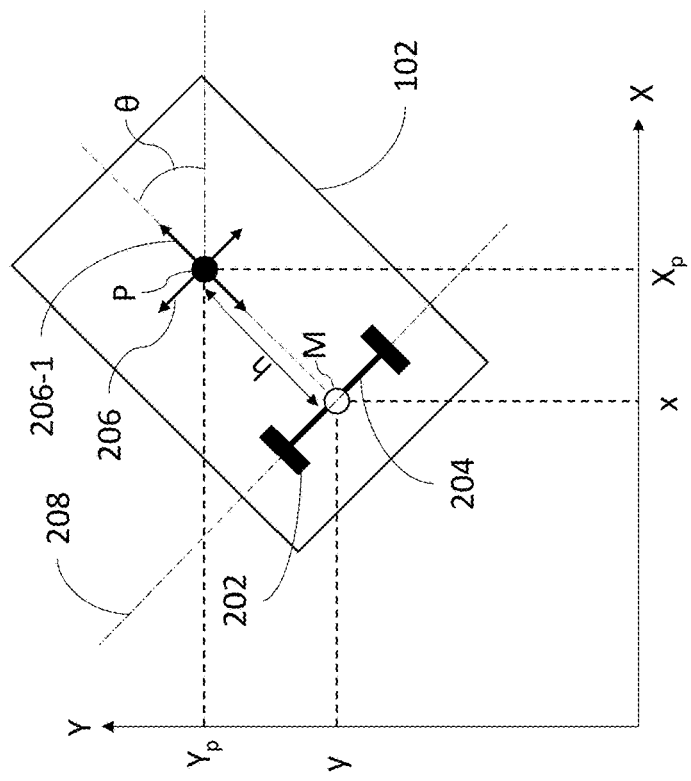
FIG. 2B is a top view of a rear wheel differential drive robot utilizing an improved control scheme, according to an exemplary embodiment.
Figure 2A:
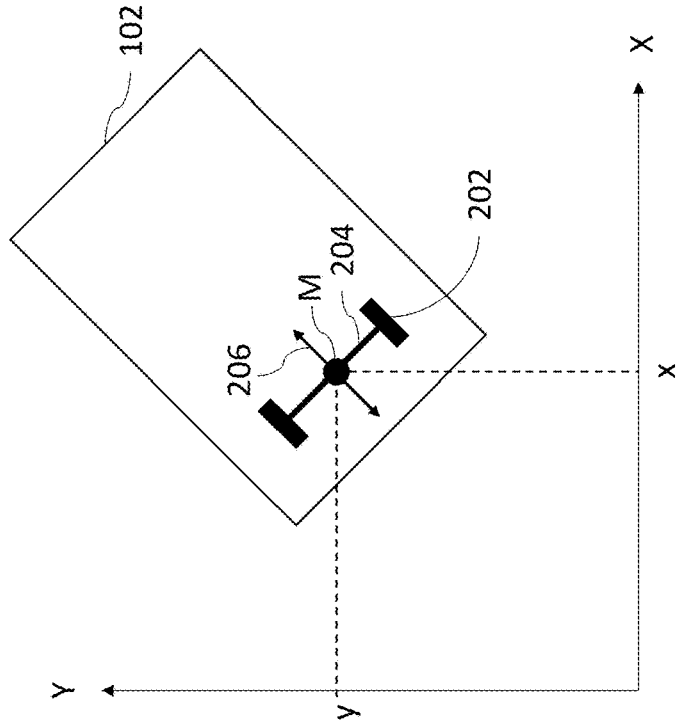
FIG. 2A is a top view of a rear wheel differential drive robot to illustrate constraints of nonholonomicity on a robotic system in accordance with some embodiments of this disclosure.

FIG. 2A is a top view of a nonholonomic differential drive robot 102, imposed on a reference X-Y coordinate plane, to illustrate the nonholonomic constraints of the robot 102, in accordance with some exemplary embodiments of the present disclosure. The robot 102 may comprise of a pair of rigid rear wheels 202 (i.e., rigid rear wheels 202 may refer to fixed position wheels or wheels of limited steering capability) coupled to a rigid axle 204, wherein motion of the rear wheels 202 are constrained by the axle 204 to move the robot 102 only translationally (i.e., forward or backward). Accordingly, the rear wheels 202 and axle 204 are constrained to move according to motion vector 206. In order to effectuate controlled movement of the robot 102, a controller 118 may utilize a nonholonomic reference point M on the rear axle 204 as a reference point such that the controller 118 may move along a target trajectory by tracing the trajectory with the reference point M. It may be appreciated by one skilled in the art that a robot configured with a differential drive system may enable point M to rotate by activating two rear wheels 202 in opposite directions simultaneously; however, the nonholonomic constraint may still exist due to the inability to move point M horizontally (i.e., 90° with respect to motion vector 206). That is, in order to move point M perpendicular to vector 206, the robot 102 must first stop in place, turn, then move forward.

The nonholonomic constraint imposed by the rigid rear axle 204 on reference point M may restrict movement of the robot 102 with respect to horizontal movement. This may require a controller 118 of the robot 102 to calculate new routes or changes to a route to account for the restriction which may be a high computational load on the controller 118 as the changes may be nonlinear and may comprise, for example, detour routes to avoid movements constrained by the nonholonomic properties of the robot 102. Additionally, a robot 102 which is constrained by the nonholonomic nature of its rear wheels 202 (or other nonholonomic locomotion system) may additionally be limited in its ability to perform tasks accurately or efficiently as the robot 102 may be required to correct for the nonholonomicity of the reference point M during navigation.

According to at least one non-limiting exemplary embodiment, a nonholonomic robot 102 may comprise a tricycle wheel configuration or other nonholonomic configuration (e.g., unicycle, tank treads, etc.). That is, the dual wheel differential drive of the robots 102 illustrated herein is not intended to be limiting.

FIG. 2B illustrates a top view of a nonholonomic differential drive robot 102, imposed on a X-Y coordinate plane, utilizing a new holonomic reference point P to navigate the robot 102, according to an exemplary embodiment. The holonomic reference point P may be of any distance h away from the point M of rear axle 204, and may be positioned at any location within or outside of the footprint (i.e., 2D projected area occupied by) of the robot 102. However, reference point P must be chosen not to lie along axis 208 as any point along the axis 208 will be considered nonholonomic. For example, reference point P may be chosen based on a feature of the robot 102 such as a location of a brush on the base of the robot 102 if the robot 102 is a floor cleaning robot. Advantageously, it is appreciated that reference point P is not constrained by the nonholonomicity of the rear axle 204 as the rear wheels 202 of the differential drive robot 102 may configure the point P to move along any direction, as denoted by motion vectors 206 pointing in all four directions.

According to at least one non-limiting exemplary embodiment, holonomic reference point P may be determined by an operator of the robot 102 or by an external server, wherein the location of the reference point P may be communicated to a controller 118 of the robot 102 via wired or wireless communication.

The new location of the holonomic reference point P, with respect to the location of reference point M, may be determined using the following equations:

$$x_p = x + h \cos \theta$$

$$y_p = y + h \sin \theta \quad \text{(Eqn. 1)}$$

Where distance h corresponds to the separation between point M and point P and theta ($\theta$) corresponds to the angle of rotation of the robot 102 with respect to the X-axis as illustrated. It is appreciated that the magnitude of h is chosen to be greater than zero (0). The equations of motion for the reference point P are as follows:

$$\begin{pmatrix} \dot{x}_p \\ \dot{y}_p \end{pmatrix} = \begin{pmatrix} \cos\theta & -h \sin\theta \\ \sin\theta & h \cos\theta \end{pmatrix} \begin{pmatrix} v \\ w \end{pmatrix} \quad \text{(Eqn. 2)}$$

Where v corresponds to translational velocity of the robot 102 along motion vector 206-1 (e.g., in meters per second)

and ω corresponds to angular velocity of the robot 102 (e.g., radians per second). Motion vector 206-1 may comprise of both x and y components. Additionally, $\dot{x}_p$ and $\dot{y}_p$ are the first derivatives with respect to time of the $x_p$ and $y_p$ coordinates of point P, respectively. Because the magnitude of h must be greater than zero (0), the above matrix relating the $\dot{x}_p$ and $\dot{y}_p$ matrix to the v and ω matrix is invertible. Accordingly, the inverse of the above matrix may be utilized to generate the control law imposed on a controller 118 of a robot 102 utilizing a point P to overcome a nonholonomic constraint as follows:

$$\begin{pmatrix} v \\ w \end{pmatrix} = \begin{pmatrix} \cos\theta & \sin\theta \\ -\frac{1}{h}\sin\theta & \frac{1}{h}\cos\theta \end{pmatrix} \begin{pmatrix} \dot{x}_P^d - k_x(x_P - x_P^d) \\ \dot{y}_P^d - k_y(y_P - y_P^d) \end{pmatrix} \quad \text{(Eqn. 3)}$$

Where $x^d_p$ and $y^d_p$ correspond to desired $x_p$ and $y_p$ positions of point P as a function of time. The values of $x^d_p$ and $y^d_p$ may change over time based on, for example, a target route to follow wherein $x^d_p$ and $y^d_p$ may change overtime as the robot 102 navigates along the route. Similarly, $\dot{x}^d_p$ and $\dot{y}^d_p$ are their corresponding time derivatives and are also functions of time. Constants $k_x$ and $k_y$ are positive gains to be chosen later or left equal to unity. State space data from a plurality of sensors units 114 of the robot 102 may be utilized to generate measurements of current $x_p$ and $y_p$ positions of reference point P such that the controller 118 may configure actuator units 108 to move the robot 102 with an angular and translational velocity determined by equation 3 given a current and desired position of point P in accordance with the above control law. It may be appreciated that equation 3 above may output values for v and ω to cause the robot 102 to move reference point P from an initial position $(x^d_p, y^d_p)$ to a desired position $(x^d_p, y^d_p)$, wherein the controller 118 may additionally execute specialized algorithms stored in memory 120 to translate the values of v and ω into control signals outputted to the actuator units 108 to effectuate the movement of the robot 102.

The above control law of equation 3 yields an additional unconventional result wherein error of the position of the reference point P decays exponentially over time. An error measurement, as a function of time, may follow the matrix below:

$$e = \begin{pmatrix} x_P - x_P^d \\ y_P - y_P^d \end{pmatrix} \quad \text{(Eqn. 4)}$$

Recall that $x_p$, $x^d_p$, $y_p$, and $y^d_p$ are all functions of time which may change as a robot 102 navigates a route or performs a task. The differences within the above error matrix represent differences between a current position of the reference point P and a desired position of the reference point P which may change over time as the current position of reference point P approaches the desired position as the robot 102 executes movement commands. The first order time derivative of the error function, e, may follow a substantially similar matrix representation, wherein $x_p$, $x^d_p$, $y_p$, and $y^d_p$ values in the above matrix for e may be represented by their corresponding time derivatives in the e matrix because $x_p$, $x^d_p$, $y_p$, and $y^d_p$ are each independent functions of time. Substituting values for $\dot{x}_p$ and $\dot{y}_p$ from equation 2 in the e matrix yields the following relationship between e and $\dot{e}$:

$$\dot{e} = \begin{pmatrix} \dot{x}_P - \dot{x}_P^d \\ \dot{y}_P - \dot{y}_P^d \end{pmatrix} = \quad \text{(Eqn. 5)}$$

$$\begin{pmatrix} \cos\theta & -h\sin\theta \\ \sin\theta & h\cos\theta \end{pmatrix} \begin{pmatrix} \cos\theta & \sin\theta \\ -\frac{1}{h}\sin\theta & \frac{1}{h}\cos\theta \end{pmatrix} \begin{pmatrix} \dot{x}_P^d - k_x(x_P - x_P^d) \\ \dot{y}_P^d - k_y(y_P - y_P^d) \end{pmatrix} - \begin{pmatrix} \dot{x}_P^d \\ \dot{y}_P^d \end{pmatrix}$$

$$\dot{e} = -\begin{pmatrix} k_x & 0 \\ 0 & k_y \end{pmatrix} e$$

The dynamics of the error function e follow a linear time-invariant (LTI) first order system with time constants denoted by $-k_x^{-1}$ and $-k_y^{-1}$. Solutions to equation 5 for the error function e follow decaying exponential functions over time. Given an initial $x_p$ and $y_p$ position of point P and an initial desired $x^d_p$ and $y^d_p$ position of point P, the error function e over time may be denoted as:

$$e = \begin{pmatrix} x_P - x_P^d \\ y_P - y_P^d \end{pmatrix} = \begin{pmatrix} (x_P(0) - x_P^d(0))e^{-k_x t} \\ (y_P(0) - y_P^d(0))e^{-k_y t} \end{pmatrix} \quad \text{(Eqn. 6)}$$

Based on equation 6, the error function e decays exponentially to zero (0) over time (i.e., x and y errors decay to zero (0) over time) based on the values of constants $k_x$ and $k_y$. Additionally, error function e is invariant of initial conditions of point P.

Lastly, the constants $k_x$ and $k_y$ may be chosen based on a frequency of the control algorithm (i.e., the frequency at which the algorithm samples sensor data to generate initial positions of point P and other state space variables). These constants are chosen such that a minimum of five (5) samples of the control algorithm elapse per time constant such that the system remains stable. In other words, the positive constants $k_x$ and $k_y$ may follow the relationship below, wherein $f_s$ represents the sampling frequency of the control algorithm. It may be appreciated that an absolute minimum of two (2) samples per time constant may be utilized; however, utilization of the absolute minimum of samples may cause the robotic system to become marginally stable, wherein the utilization of, for example, five (5) or more samples may push the robotic system further into stability.

$$k_x \leq f_s/5$$

$$k_y \leq f_s/5 \quad \text{(Eqn. 7)}$$

Figure 3B:
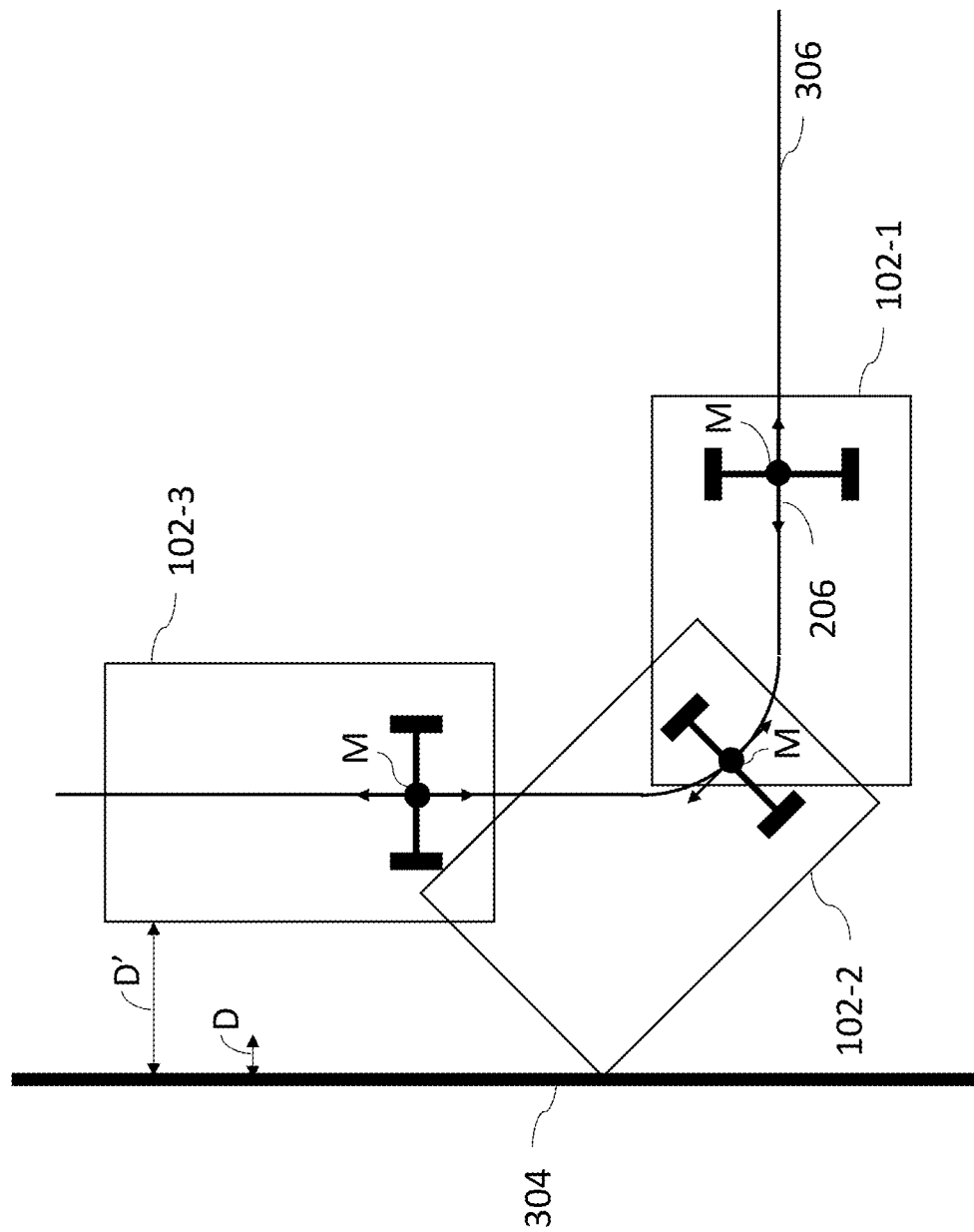
FIG. 3B is a top view of a nonholonomic robot utilizing a nonholonomic reference point to navigate close to a wall, according to an exemplary embodiment.

Advantageously, due to the exponential decay of the error function over time, a position of point P may be accurately controlled by the controller 118, thereby enhancing the ability of the controller 118 to accurately effectuate movement of the robot 102 despite the nonholonomicity of the robot 102 caused by its rear wheel configuration as the robot 102 follows a path or route. Additionally, due to the rapidly decaying error function and enhanced control accuracy, a nonholonomic robot 102 utilizing the systems and methods of the present disclosure may perform additional functionalities or functionalities with enhanced accuracy. For example, a nonholonomic robot 102 utilizing a point M on its rear axle may be tasked with cleaning a floor, wherein the robot 102 may be required to navigate a close distance to nearby walls. While utilizing the point M, the nonholonomicity of the reference point M may cause the robot 102 to be greatly affected by the nonholonomicity during navigation of routes and therefore require that the robot navigate with additional margin for error from the nearby walls (i.e., navigate further from walls), as illustrated in FIGS. 3A-B below. Utilizing a separate holonomic reference point P, a holonomic point with full degrees of freedom, the robot 102 may navigate significantly closer to the nearby walls due to the rapidly decaying error function and improved holonomic control of the reference point P, and may thereby enhance its cleaning or other capabilities. A plurality of other similar benefits to utilizing a point P to enhance accuracy of movement control of a nonholonomic robot 102 are readably discernable by one skilled in the art given the present disclosure and above equations.

FIG. 3A is a top view of a nonholonomic differential drive robot 102 shown at three different locations along a route 302 comprising of a turn and navigation nearby a wall 304, according to an exemplary embodiment. The robot 102 is tasked with executing the turn, then navigating as close as possible to the wall 304. Accordingly, to improve motion control of the robot 102 during the turn, a point P is chosen as a reference point to trace the route 302, wherein point P may be moved in any direction by the robot 102 activating one or both wheels of its differential drive, as denoted by movement vectors 206. As the robot 102 navigates along the route, point P is maintained along the route 302 as illustrated. The executed movement of the robot 102 illustrated in FIG. 3A may be illustrative of an ideal scenario, wherein the minimum distance between a point on the robot 102 and the wall 304 is equal to or substantially zero (e.g., at the position of robot 102-2). Upon executing the turn, the robot 102-3 is of distance D from the wall 304 as it continues along route 302. It may be appreciated that distance D may be reduced to zero, substantially close to zero, or that of negligible value, for the specific movement illustrated (i.e., a right turn next to a wall 304) if point P is chosen to be the coordinate of the upper left corner of robot 102-3, and corresponding corners of robots 102-1 and 102-2, as illustrated below in FIG. 6.

In comparison to FIG. 3A, FIG. 3B is a top view of a nonholonomic robot 102 shown at three locations along a route 306, according to an exemplary embodiment. The robot 102 may utilize a nonholonomic reference point M located between two rear differential drive wheels, wherein point M may be nonholonomic and constrained to move only along movement vectors 206 and rotationally about reference point M. Route 306 may be substantially similar to route 302 illustrated above in FIG. 3A; however, route 306 may be (linearly) shifted to account for the spatial separation between points M and P within the reference frame of the robot 102 or world frame (for any singular instance in time). That is, the shift may comprise of a linear transformation based on the distance h chosen between points P and M. Additionally, the movement illustrated in FIG. 3B is illustrative of an ideal right turn nearby the wall 304, wherein the minimum distance between the wall and the robot 102 is zero (e.g., at the position of robot 102-2) or substantially zero or that of negligible value.

While utilizing the reference point M to navigate the route 306, the robot 102-3 may be of distance D' away from the wall 304 upon completion of the turn. As illustrated, D' is of significantly greater value than D, the distance between the wall and robot 102-3 as illustrated in FIG. 3A above. The robot 102, utilizing the reference point M, may iteratively turn and straighten itself by executing computer readable instructions, code or algorithm, as it navigates nearby the wall 304 such that the distance D' may be reduced. However, this iterative process may consume additional time, energy, may be visually unappealing, unpredictable to nearby humans, and require additional space to minimize D'.

Advantageously, the use of a holonomic reference point P to navigate a nonholonomic robot 102 yields an unconventional result in that a nonholonomic robot 102 may utilize a holonomic reference point P to navigate along any route, despite the nonholonomic limitations imposed on the robot 102. A nonholonomic robot 102 may still be capable of navigating a complex route (e.g., a 90° sharp turn or route 502, as illustrated below); however, use of a holonomic reference point P may further enhance the efficiency at which the robot 102 navigates the complex route as the holonomic properties of point P may be utilized to trace the complex route continuously. Whereas, use of a nonholonomic reference point M may require the robot 102 to halt at sharp bends and adjust itself or its route if the robot 102 is required to move in a constrained direction. That is, due to the ability of the robot 102 to move point P in any direction, the robot 102 may utilize the point P to traverse any route despite the nonholonomic properties of the robot 102. Additionally, if point P is chosen based on a feature of the robot 102, such as a scrubber, brush, vacuum, pump, hose, yard trimmer, or other features coupled to the robot, which enable the robot 102 to perform tasks, control of the feature is enhanced. For example, as illustrated in FIG. 3A, if point P is a location of a vacuum of the robot 102, the robot 102 may vacuum debris closer to the wall 304 when using the point P to trace route 302 as compared to use of point M to trace route 306 thereby increasing cleanable area which the robot 102 may navigate the vacuum over.

For example, as illustrated next in FIG. 4, a robot 102 may utilize a holonomic reference point P to execute a perfect 90° turn, wherein the point P may trace the 90° turn exactly and continuously (i.e., without stopping). Utilization of a nonholonomic point M between the rear wheels to execute the 90° turn may force the robot 102 to complete stop at the corner of the turn, execute a turn in place, and continue forward along the route, thereby requiring additional time to execute the same 90° turn. That is, route comprising one or more points with an undefined derivative (e.g., sharp corners) may still be continuously and accurately navigated by the robot 102 moving point P. Use of point M to navigate these non-differentiable portions of the route may require the robot 102 to stop, turn, and then reaccelerate, which will require additional time and increased power.

Figure 5:
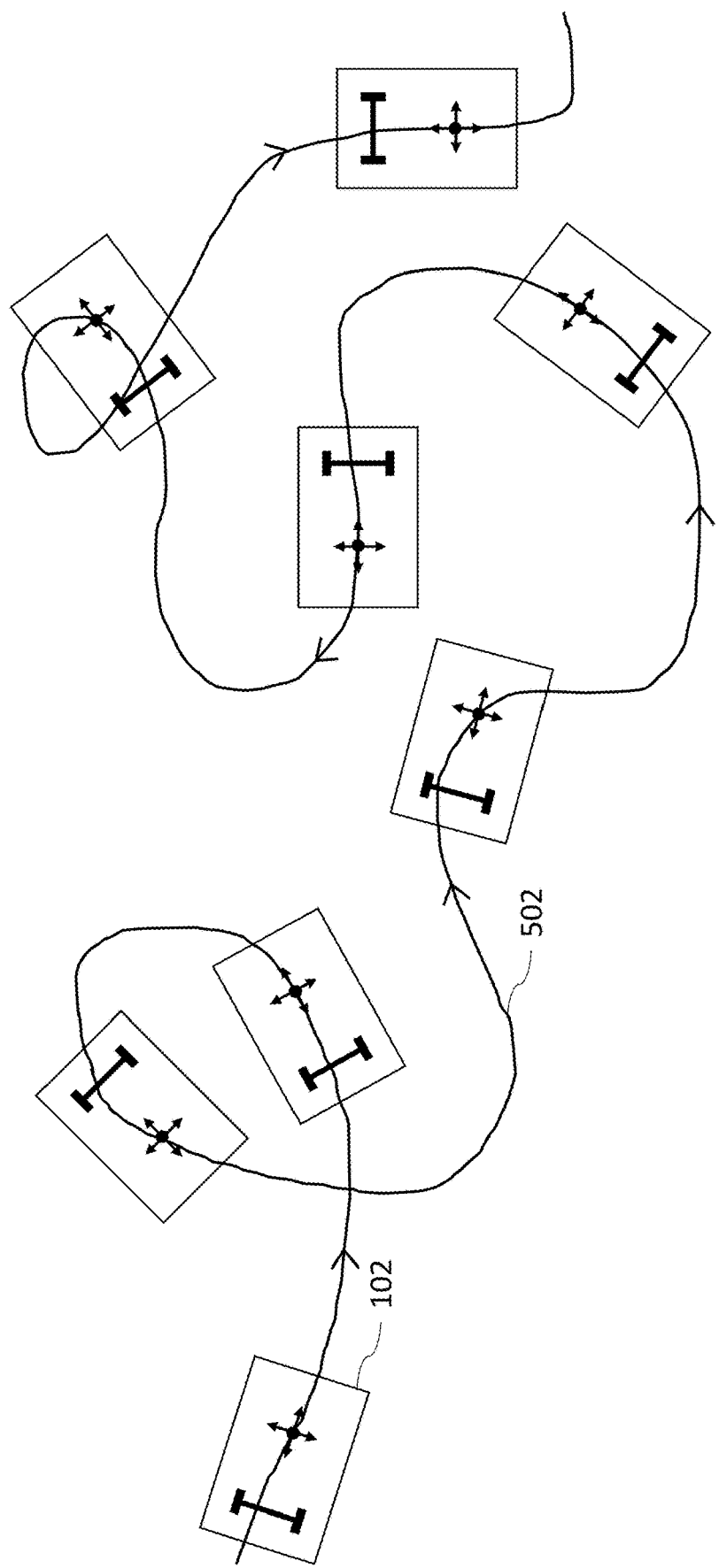
FIG. 5 is a top view of a nonholonomic robot utilizing a holonomic reference point to execute a complex route comprising of a plurality of sharp turns and loops, according to an exemplary embodiment.

As another illustrative example, FIG. 5 illustrates a nonholonomic robot 102 traversing a complex route 502 comprising of a plurality of sharp turns and loops, according to an exemplary embodiment. Due to the holonomicity of point P, a controller 118 of the robot 102, as discussed above, may accurately trace the route 502 utilizing point P, thereby accurately navigating the complex route 502. Utilization of a nonholonomic point M between the rear wheels to execute route 502 may force the robot 102 to halt briefly at locations along the route 502 comprising of sharp turns and rotate in place about point M. That is, the nonholonomic properties of the reference point M may impose added constraints to movement of the robot 102 along portions of the complex route 502.

Figure 4:
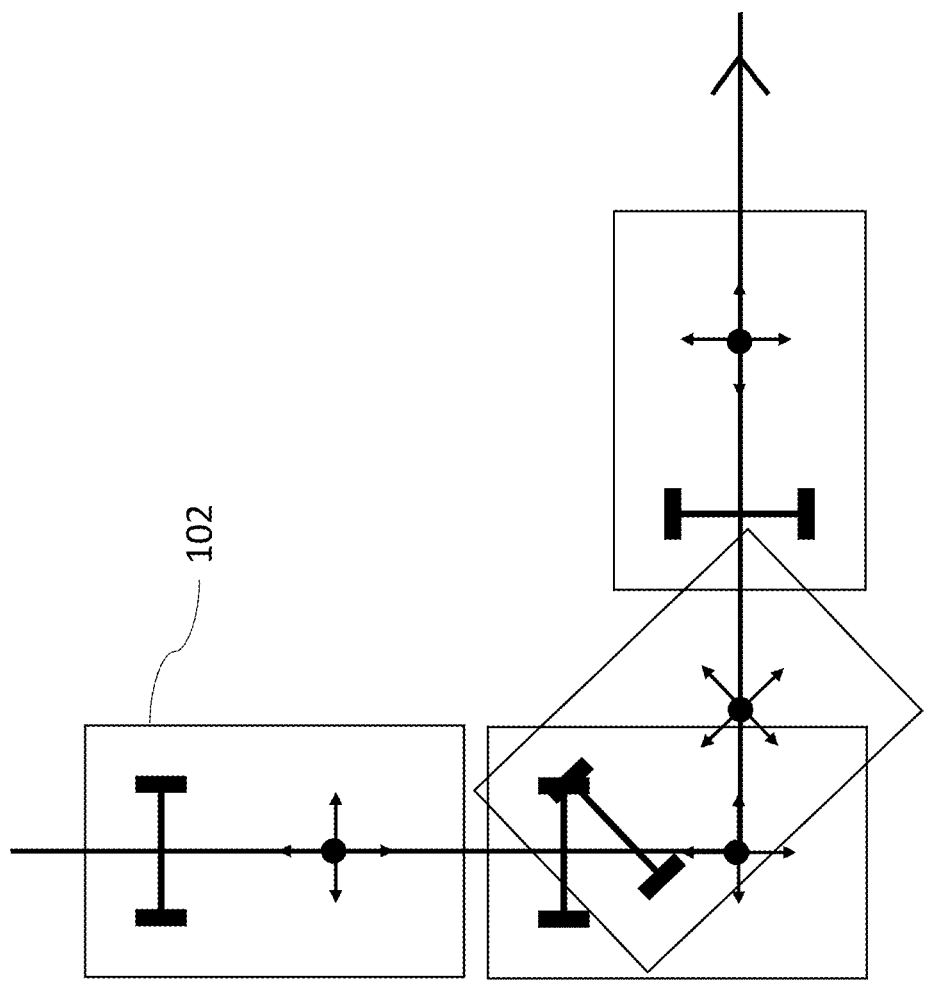
FIG. 4 is a top view of a nonholonomic robot utilizing a holonomic reference point to execute a sharp 90° turn, according to an exemplary embodiment.

It may be appreciated that the exemplary embodiments illustrated in FIG. 4-5 illustrate a robot 102 navigating a complex, difficult route in the absence of obstacles. If obstacles are introduced nearby the route 502, for example, portions of the route 502 may be changed to account for the obstacles and avoid collision.

It may be additionally appreciated by one skilled in the art that a robot 102 navigating the complex route 502 utilizing a holonomic reference point P, as discussed above, may execute substantially different motor commands as compared to a robot 102 utilizing a nonholonomic reference point M to navigate a substantially similar route (i.e., substantial state space parameter differences between the two robots at substantially similar positions along the route 502). In some instances, however, this may be desirable. For example, if the reference point P is chosen based on a feature of the robot 102, such as a vacuum cleaning feature, then the movements of the robot 102 may not be of significance provided the point P, and therefore the vacuum cleaning feature, moves over desired locations defined by route 502. Additionally, given a complex route, such as route 502, motion of the robot 102 based on a holonomic reference point P may further reduce the time required to move the reference point P, and therefore the vacuum cleaning feature, through the desired route as the position of the reference point P is not constrained by the nonholonomic properties of the robot 102. As another example, if a route 502 comprises a loop, a robot 102 utilizing a holonomic reference point P may not move its chassis through the full loop, rather the robot 102 may simply move the reference point P in a circular fashion in accordance with the loop. Conversely, use of a nonholonomic reference point M would require the reference point M to execute the full loop due to the nonholonomic constraint of the reference point M.

Figure 6:
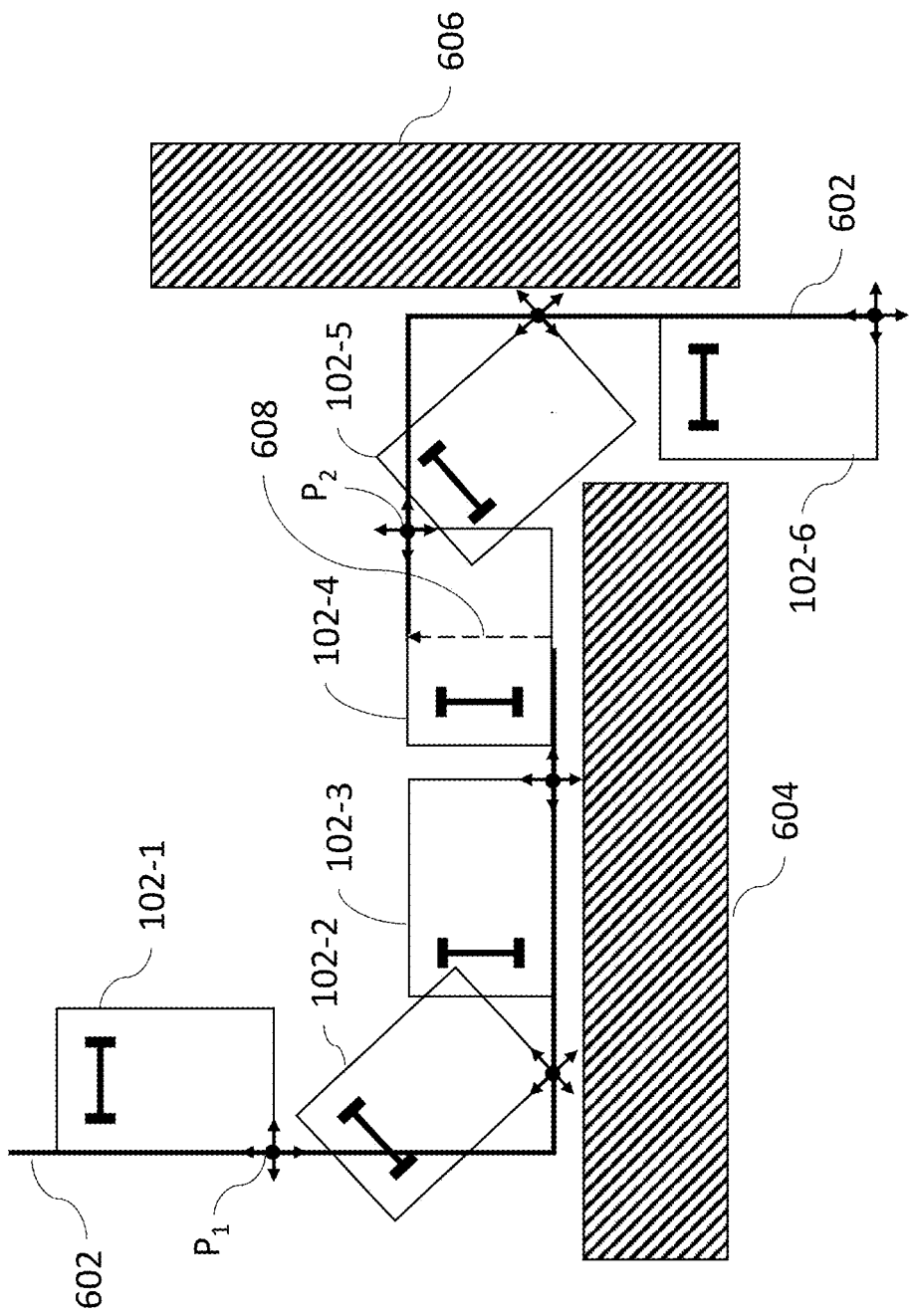
FIG. 6 is a top view of a nonholonomic robot utilizing multiple holonomic reference points to execute different movements, according to an exemplary embodiment.

FIG. 6 illustrates a robot 102, at a plurality of locations, utilizing a holonomic reference point P to navigate along a route 602 comprising of two sharp turns and navigation close to walls 604 and 606, according to an exemplary embodiment. The robot 102 may additionally be constrained to navigate close to the walls and execute sharp 90° turns to accomplish a task (e.g., cleaning a floor nearby shelves in a store). As previously illustrated and discussed in conjunction with FIG. 4, utilization of a holonomic reference point P may be utilized to execute the sharp 90° turns. Additionally, as discussed previously, to minimize a distance between a wall 604 and the robot 102, a reference point $P_1$ is chosen to be positioned at the bottom left corner of robot 102-1 such that distance between the wall 604 and the robot 102 is minimized upon completion of the left turn (i.e., at location of robot 102-3).

Upon the robot navigating to a subsequent, different position 102-3, a controller 118 of the robot 102 may determine a right turn is approaching based on route data stored in memory 120. Accordingly, the controller 118 may change the reference point $P_1$ to reference point $P_2$ to minimize the distance between the wall 606 and the robot 102 upon execution of the second right turn. This change from reference point $P_1$ to reference point $P_2$ may be done ahead of time and prior to the robot 102 approaching the curve where a turn is needed to be made. At the location of robot 102-3, route 602 may be linearly translated by the controller 118 on a computer readable map, stored in memory 120, based on the difference between points $P_1$ and $P_2$. This linear translation may comprise of a linear shift of the route 602 denoted by translation 608.

It may be appreciated by one skilled in the art that the second turn (e.g., positions of robot 102-4 through 102-6) may be executed using the nonholonomic reference point $P_1$ without a linear transformation 608 applied to the route. However, it may be beneficial in some instances to utilize two, or more, holonomic reference points $P_1$ and $P_2$ based on functionalities of the robot 102 and tasks assigned to the robot 102. For example, reference points $P_1$ and $P_2$ may be locations of two modules or features of a robot 102 required to execute two separate tasks. Wherein, it may be desirable to navigate the robot 102 about a reference point corresponding to a module in use.

According to at least one non-limiting exemplary embodiment, a controller 118 may determine a plurality of holonomic reference points $P_n$ to maximize its efficiency of movement, as previously illustrated in FIG. 6. For example, a route may be given to a robot 102 by an operator, wherein the given route may be created with respect to a nonholonomic reference point M. Accordingly, a controller 118 of the robot 102 may determine a plurality of linear translations to the given route such that the controller 118 may utilize a plurality of different holonomic reference points $P_n$, each corresponding to one of the translated routes at different locations along the given route to navigate the given route efficiently and accurately. It may be appreciated that translated routes and corresponding holonomic reference points P~ may additionally be determined during navigation of a route in real time as the linearity of the translation may not impose significant computations to the controller 118. Dynamic adjustment of a holonomic reference point P utilized during navigation of a route may enhance the ability of the controller 118 to execute a plurality of different tasks with high precision as the controller 118 may utilize an optimal reference point P to execute an optimal corresponding movement.

According to at least one non-limiting exemplary embodiment, a nonholonomic robot 102 may utilize a plurality of holonomic reference points simultaneously to navigate a route. For example, a rectangular robot 102 may utilize four (4) holonomic reference points positioned on each corner of the robot such that the robot 102 may accurately execute movements (e.g., turning nearby walls or obstacles while maintaining a minimum distance to the walls or obstacles). Simultaneous use of two or more holonomic reference points may further comprise the robot 102 following two or more corresponding routes simultaneously with each of the holonomic reference points.

According to the inventive concepts discussed herein, a method, a non-transitory computer readable medium and system for controlling a robotic system are disclosed. The non-transitory computer readable medium and system comprising a controller configurable to execute computer readable instructions stored on a memory, and method performing steps, comprising, inter alia, determining a first holonomic reference point within or nearby the robotic system, the first holonomic reference point being separated by a distance from a nonholonomic reference point; utilizing the first holonomic reference point to navigate along a target trajectory, the target trajectory being defined by a linear transformation of an initial trajectory defined with respect to an initial reference point; and applying the linear transformation to the initial trajectory based on a spatial difference between the first holonomic reference point and the initial reference point. Further, determining a second holonomic reference point, at a separate location from the first holonomic reference point, and utilize either the first or second holonomic reference points at different locations along the target trajectory to execute different movements of the target trajectory, each movement corresponding to use either the first or second holonomic reference points. Wherein, the initial reference point is either the holonomic reference point or the nonholonomic reference point; the holonomic reference point is chosen based on a location of a feature of the robot, the feature including at least one of a scrubber, brush, vacuum, pump, hose, yard trimmer, or freely rotating wheel; and the nonholonomic reference point is located between two rear differential drive wheels of the robotic system.

It will be recognized by one skilled in the art that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and affected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term "includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for controlling a robotic system, comprising:
    determining a first holonomic reference point within or nearby the robotic system, the first holonomic reference point being separated by a distance from a nonholonomic reference point;
    identifying a first reference point within or nearby the robotic system based at least in part on a determination that the first reference point is holonomic, the first reference point being separated by a distance from a nonholonomic reference point;
    identifying a second reference point at a separate location from the first reference point based at least in part on a determination that the second reference point is holonomic;
    utilizing the first reference point to navigate along a target trajectory, the target trajectory being defined by a linear transformation of an initial trajectory defined with respect to an initial reference point, wherein utilizing the first reference point to navigate along the target trajectory comprises executing a first movement along the target trajectory at a first location along the target trajectory; and
    utilizing the second reference point to navigate along the target trajectory based at least in part on the determination that the second reference point is holonomic, wherein utilizing the second reference point to navigate along the target trajectory comprises executing a second movement along the target trajectory at a second location along the target trajectory different from the first location.

2. The method of claim 1, further comprising:
    applying the linear transformation to the initial trajectory based on a spatial difference between the first reference point and the initial reference point.

3. The method of claim 1, wherein,
    the initial reference point is either a holonomic reference point or the nonholonomic reference point.

4. The method of claim 1, wherein,
    the second reference point is chosen based on a location of a feature of the robot, the feature including at least one of a scrubber, brush, vacuum, pump, hose, yard trimmer, or freely rotating wheel.

5. The method of claim 1, wherein the nonholonomic reference point is located between two rear differential drive wheels of the robotic system.

6. A robotic system, comprising:
a non-transitory computer readable storage medium comprising a plurality of computer-readable instructions stored thereon; and
a processing device configurable to execute the plurality of computer-readable instructions to:
identify a first reference point within or nearby the robotic system based at least in part on a determination that the first reference point is holonomic, the first reference point being separated by a distance from a nonholonomic reference point;
identify a second reference point at a separate location from the first reference point based at least in part on a determination that the second reference point is holonomic;
utilize the first reference point to navigate along a target trajectory, the target trajectory being defined by a linear transformation of an initial trajectory defined with respect to an initial reference point, wherein utilizing the first reference point to navigate along the target trajectory comprises executing a first movement along the target trajectory at a first location along the target trajectory; and
utilize the second reference point to navigate along the target trajectory based at least in part on the determination that the second reference point is holonomic, wherein utilizing the second reference point to navigate along the target trajectory comprises executing a second movement along the target trajectory at a second location along the target trajectory different from the first location.

7. The robotic system of claim 6, wherein the processing device is further configurable to execute the plurality of computer-readable instructions to,
apply the linear translation to the initial trajectory based on the spatial differences of the first reference point and the initial reference point.

8. The robotic system of claim 6, wherein,
the initial reference point may be a holonomic reference point or the nonholonomic reference point.

9. The robotic system of claim 6, wherein,
the second reference point is chosen based on a location of a feature of the robot, the feature including at least one of a scrubber, brush, vacuum, pump, hose, yard trimmer, or freely rotating wheel.

10. The robotic system of claim 6, wherein the nonholonomic reference point is located between two rear differential drive wheels of the robotic system.

11. A non-transitory computer readable storage medium comprising a plurality of computer readable instructions stored thereon, that when executed by a processing device, configure the processing device to,
identify a first reference point within or nearby the robotic system based at least in part on a determination that the first reference point is holonomic, the first reference point being separated by a distance from a nonholonomic reference point;
identify a second reference point at a separate location from the first reference point based at least in part on a determination that the second reference point is holonomic;
utilize the first reference point to navigate along a target trajectory, the target trajectory being defined by a linear transformation of an initial trajectory defined with respect to an initial reference point, wherein utilizing the first reference point to navigate along the target trajectory comprises executing a first movement along the target trajectory at a first location along the target trajectory; and
utilize the second reference point to navigate along the target trajectory based at least in part on the determination that the second reference point is holonomic, wherein utilizing the second reference point to navigate along the target trajectory comprises executing a second movement along the target trajectory at a second location along the target trajectory different from the first location.

12. The non-transitory computer readable storage medium of claim 11, wherein the processing device is further configurable to execute the plurality of computer readable instructions to,
apply the linear translation to the initial trajectory based on the spatial differences of the first reference point and the initial reference point.

13. The non-transitory computer readable storage medium of claim 11, wherein,
the initial reference point may be a holonomic reference point or the nonholonomic reference point.

14. The non-transitory computer readable storage medium of claim 11, wherein,
the second reference point is chosen based on a location of a feature of the robot, the feature including at least one of a scrubber, brush, vacuum, pump, hose, yard trimmer, or freely rotating wheel.

15. The non-transitory computer readable storage medium of claim 11, wherein the nonholonomic reference point is located between two rear differential drive wheels of the robotic system.

* * * * *